Figure 1:
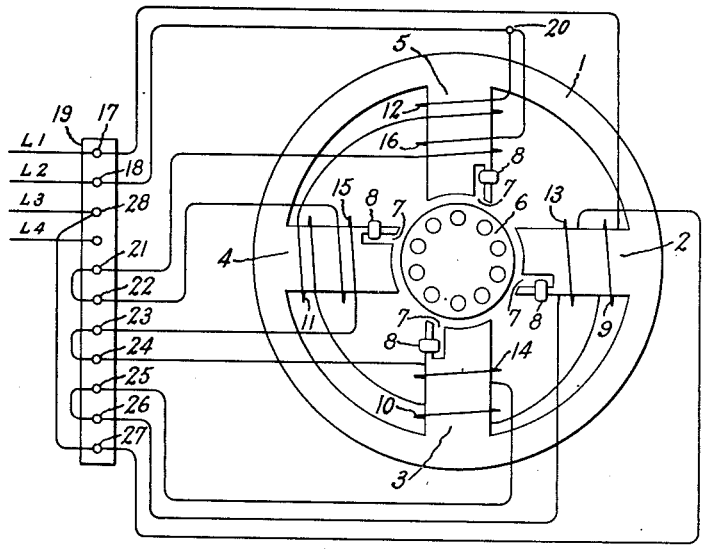

Oct. 9, 1951  J. C. WILLSEY  2,570,894
MULTISPEED MOTOR

Filed Nov. 3, 1950 2 Sheets—Sheet 1

Inventor:
John C. Willsey,
by Ernest C. Britton
His Attorney.

Oct. 9, 1951 J. C. WILLSEY 2,570,894
MULTISPEED MOTOR

Filed Nov. 3, 1950 2 Sheets-Sheet 2

Inventor:
John C. Willsey,
by Ernest C. Britton
His Attorney.

Patented Oct. 9, 1951

2,570,894

UNITED STATES PATENT OFFICE 2,570,894

MULTISPEED MOTOR

John C. Willsey, Fort Wayne, Ind., assignor to General Electric Company, a corporation of New York Application November 3, 1950, Serial No. 193,786

5 Claims. (Cl. 318—223)

This invention relates to multi-speed motors and more particularly to multi-speed single phase induction motors which may be selectively operated at any one of a number of preselected speeds.

It is frequently desirable in the design of alternating current motors, particularly single phase induction motors of the shaded pole type and in the fractional horsepower frame sizes, to provide a motor which is selectively operable at two or three preselected speeds without the utilization of external control devices.

An object of this invention is to provide an improved multi-speed single phase induction motor.

Another object of this invention is to provide improved multi-speed single phase induction motor which may be selectively operated at any one of a number of preselected speeds.

A further object of this invention is to provide an improved multi-speed single phase induction motor which may be selectively operated at any one of a number of preselected speeds without the necessity for utilizing external control devices.

Further objects and advantages of this invention will become apparent and the invention will be better understood by reference to the following description and the accompanying drawings, and the features of novelty which characterize this invention will be pointed out with particularity in the claims annexed to and forming a part of this specification.

In accordance with one aspect of this invention, a multi-speed single phase induction motor is provided having a stator with four pole pieces spaced in quadrature. These pole pieces may be provided with shading coils in order to secure single phase starting. Each of the pole pieces has a main winding and an auxiliary winding arranged thereon, the main windings being connected in series to form a first winding circuit to provide a first speed when connected across a source of alternating current. To provide a two speed motor, the auxiliary windings are connected in series forming a second winding circuit and the first and second circuits are connected in series to provide the second speed when connected across the alternating current source. In a three speed motor, two alternate auxiliary windings are connected in series forming a second winding circuit which is in turn connected in series with the first winding circuit to provide the second speed. All of the auxiliary windings are connected in series forming a third winding circuit which in turn is connected in series with the first winding circuit to provide the third speed.

Figure 2:
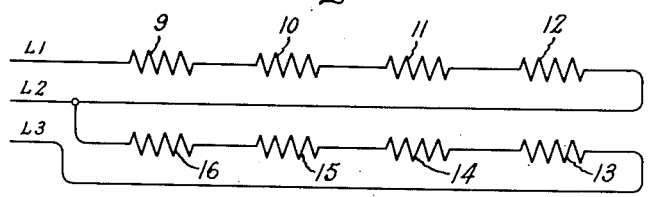
Figure 3:
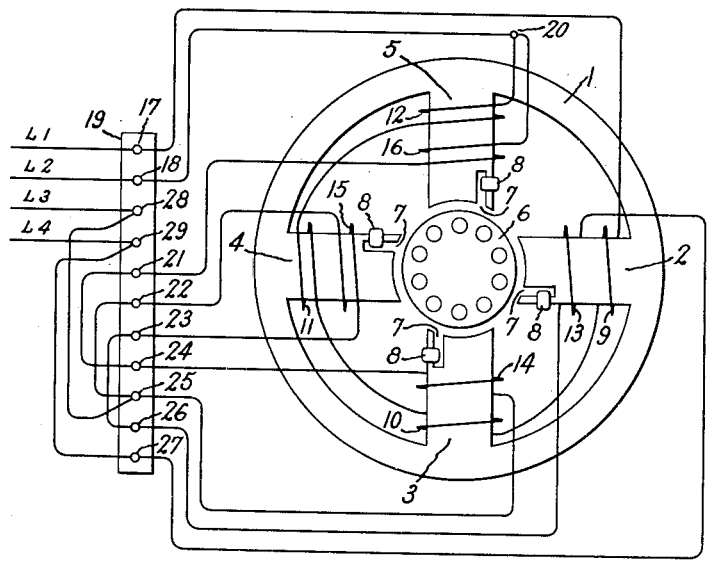
Figure 4:
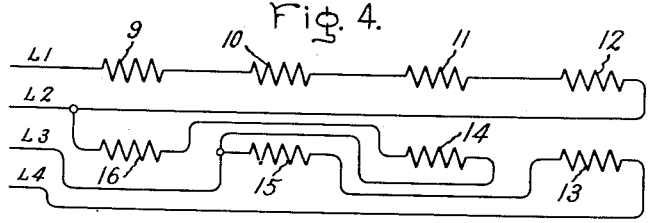

In the drawing, Fig. 1 is a diagrammatic view showing the improved multi-speed motor of this invention arranged for two speed operation; Fig. 2 is a schematic view of the windings of the improved motor of Fig. 1; Fig. 3 is a diagrammatic view showing the improved multi-speed single phase induction motor of this invention arranged for three-speed operation; Fig. 4 is a schematic view of the winding arrangement of the motor of Fig. 3; and Fig. 5 is a schematic view showing an alternative connection for providing three speed operation.

Referring now to Figs. 1 and 2, there is shown a stator frame 1 having four pole pieces 2, 3, 4 and 5 arranged in quadrature around a conventional squirrel cage rotor 6. Each of the pole pieces is slotted, as at 7, to accommodate a shading coil 8 in order to provide a rotating field for single phase starting. In order to provide for two speed operation, each of the pole pieces 2, 3, 4 and 5 is respectively provided with main windings 9, 10, 11 and 12 and with auxiliary windings 13, 14, 15 and 16. The main windings 9, 10, 11 and 12 are permanently connected in series, as shown in Fig. 1 and are brought out to terminals 17 and 18 of terminal board 19. The serially connected main windings 9, 10, 11 and 12 comprise a first winding circuit and when this circuit is connected across a source of alternating current by lines 1 and 2, the first rotational speed is provided. One side of the auxiliary winding 16 is permanently connected to one side of the first winding circuit, as at 20 and the other side is brought out to a terminal 21 of the terminal board 19. Both ends of the auxiliary winding 15, are brought out to terminals 22 and 23, both ends of auxiliary winding 14 are brought out to terminals 24 and 25, and both ends of auxiliary winding 13 are brought out to terminals 26 and 27. To provide the second speed, which is lower than the first speed, auxiliary windings 13, 14, 15 and 16 are connected in series and arranged to "buck" the main windings, as shown in Fig. 1, to form a second winding circuit which in turn is arranged in series with the first winding circuit comprising main windings 9, 10, 11 and 12. The one side of the second winding circuit is connected to one side of the first winding circuit at 20, and the other side is connected to terminal 28 of the terminal board 19. Thus, when the first and second winding circuits are so connected in series, and the source of alternating current is connected across lines 1 and 3, the second rotational speed is provided. It will be readily understood that the multiple-speed operation of this motor is provided by varying the flux density and therefore the power output, which in turn results in a change of speed for a given load. Thus, with the main and auxiliary windings arranged as shown in Fig. 1, and with both main and auxiliary windings connected in series, the flux density is reduced from that provided by the main windings alone, and therefore the power output is reduced. Thus, with the same load, a lower second speed is provided due to increased slip. It will be readily understood that the main and auxiliary windings may be arranged to "aid" rather than "buck." In this case, the flux density obtained with both main and auxiliary windings energized is higher than that obtained when the main windings alone are energized, and thus the second speed for the same load would be higher than the first by virtue of the greater flux density, and therefore greater power output available. However, it has been found that the arrangement shown in Fig. 1 with the main and auxiliary windings bucking and the second speed lower than the first is preferable.

In order to provide a 3-speed motor, it has been found desirable to utilize two alternate auxiliary windings for the second speed and all of the auxiliary windings for the third speed. Referring now to Figs. 3 and 4, in which like elements are indicated by like reference numerals, in this circuit arrangement, the first speed is again provided by merely connecting the first winding circuit comprising the main windings 9, 10, 11 and 12 across a source of alternating current by means of lines 1 and 2. To secure the second speed, again lower than the first, alternate auxiliary windings 16 and 14 which in this case form the second winding circuit are connected in series "bucking" main windings 12 and 10 and the second winding circuit is arranged in series with the first winding circuit across lines 1 and 3. To provide the third speed, still lower than the second speed, auxiliary windings 15 and 13 are arranged in series with auxiliary windings 16 and 14 and "bucking" main windings 11 and 9 to provide a third winding circuit which in turn is arranged in series with the first circuit across lines 1 and 4. Comparison of Figs. 1 and 3 will now show that Fig. 1 illustrates the terminal board connections for 2 speed operation while Fig. 3 illustrates the terminal board connections for three speed operation. In the case of Fig. 1, connecting the alternating current source across lines 1 and 2 will provide the first speed while connecting the source across lines 1 and 3 will provide the second speed. In the case of Fig. 3, connecting the source across lines 1 and 2 will again produce the first speed, the second speed is produced by connecting the source across lines 1 and 3, while the third speed is now provided by connecting the source across lines 1 and 4. It will be apparent that the three speeds are provided by progressively lowering the flux density, thus lowering the power output and producing progressively lower speeds at the same load due to increased slip. The connection of alternate auxiliary windings for the second speed, in the case of the three speed connection, prevents magnetic unbalance at the second speed which would cause low starting torque.

Figure 5:
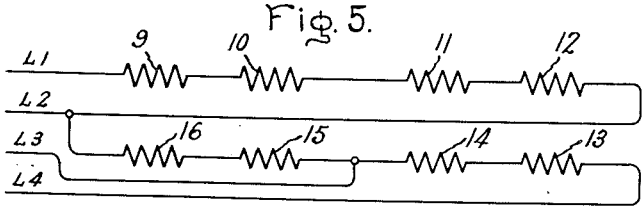

An alternative three speed connection is shown schematically in Fig. 5 in which the first or high speed is again provided by serially connecting main windings 9, 10, 11 and 12 to form a first winding circuit which is connected across a source of alternating current by means of lines 1 and 2. The second or intermediate speed is in this case provided by connecting two adjacent auxiliary windings 16 and 15 in series to form a second winding circuit which is in turn serially connected with the first winding circuit across the source of alternating current by means of lines 1 and 3. The third or lowest speed is provided by serially connecting all of the auxiliary windings 13, 14, 15 and 16 in a third winding circuit arranged in series with the first winding circuit across the source of alternating current by means of lines 1 and 4. Here again, the three speeds are secured by progressively lowering the flux density with a corresponding decrease in power output, thus progressively lowering the speed at the same load because of increased slip. It has been found however that the circuit arrangement of Fig. 4 is the preferred form since the circuit of Fig. 5 will provide poor starting torque on the second speed.

While a four pole motor has been shown and described, it will be readily apparent that this invention is equally applicable to two and six pole motors, or to a motor having any multiple of two poles. Furthermore, while the inter-pole connections of the windings are shown as being connected to terminal board 19, it will be readily understood that in the interests of economy, these connections may be made internally.

It will now be readily apparent that this invention provides an improved multi-speed single phase induction motor circuit which permits of the selection of any one of two or three speeds without the utilization of external control devices.

While I have illustrated and described particular embodiments of this invention, further modifications and improvements will occur to those skilled in the art and I desire that it be understood therefore that this invention is not limited to the specific arrangements shown and I intend in the appended claims to cover all modifications within the spirit and scope of this invention.

What I claim as new and desire to secure by Letters Patent of the United States is:

1. In a multi-speed single phase induction motor, a stator having four pole pieces spaced in quadrature, each of said pole pieces having a main winding and an auxiliary winding arranged thereon, said main windings being connected in series forming a first winding circuit to provide a first speed when connected across a source of alternating current, two of said auxiliary windings being connected in series forming a second winding circuit and said first and second circuits being connected in series to provide a second speed when connected across said source, all of said auxiliary windings being connected in series forming a third winding circuit and said first and third circuits being connected in series to provide a third speed when connected across said source.

2. In a multi-speed single phase induction motor, a stator having four pole pieces spaced in quadrature, each of said pole pieces having a main winding and an auxiliary winding arranged thereon, said main windings being connected in series forming a first winding circuit to provide a first speed when connected across a source of alternating current, the first and third of said auxiliary windings being connected in series forming a second winding circuit and said first and second circuits being connected in series to provide a second speed when connected across said source, the first of said auxiliary windings being serially connected to the third, the third to the second, and the second to the fourth forming a third series winding circuit and said first and third circuits being connected in series to provide a third speed when connected across said source.

3. In a multi-speed single phase induction motor, a stator having four pole pieces spaced in quadrature, each of said pole pieces having a main pole portion and a shaded pole portion, each of said pole pieces having a main winding and an auxiliary winding arranged thereon, said main windings being connected in series forming a first winding circuit to provide a first speed when connected across a source of alternating current, the first and third of said auxiliary windings being connected in series forming a second winding circuit and said first and second circuits being connected in series to provide a second speed when connected across said source, the first of said auxiliary windings being serially connected to the third, the third to the second, and the second to the fourth forming a third series winding circuit and said first and third circuits being connected in series to provide a third speed when connected across said source.

4. In a multi-speed single phase induction motor, a stator having four pole pieces spaced in quadrature, each of said pole pieces having a main winding and an auxiliary winding arranged thereon, said main windings being connected in series forming a first winding circuit to provide a first speed when connected across a source of alternating current, two alternate auxiliary windings being connected in series forming a second winding circuit and said first and second circuits being connected in series to provide a second speed when connected across said source, the other two alternate auxiliary windings being serially connected with the first two alternate auxiliary windings forming a third series winding circuit and said first and third circuits being connected in series to provide a third speed when connected across said source.

5. In a multi-speed single phase induction motor, a stator having at least two pole pieces, each of said pole pieces having a main winding and an auxiliary winding arranged thereon, said main windings being connected in series forming a first winding circuit to provide a first speed when connected across a source of alternating current, at least one of said auxiliary windings being connected in series with said first winding circuit to provide a second speed when connected across said source, all of said auxiliary windings being connected in series with said first winding circuit to provide a third speed when connected across said source.

JOHN C. WILLSEY.

REFERENCES CITED

The following references are of record in the file of this patent:

UNITED STATES PATENTS

| Number | Name | Date |
| --- | --- | --- |
| 2,266,088 | Shea | Dec. 16, 1941 |